United States Patent
Chen et al.

(10) Patent No.: US 12,412,267 B2
(45) Date of Patent: *Sep. 9, 2025

(54) METHOD AND SYSTEM TO OBTAIN CYTOLOGY IMAGE IN CYTOPATHOLOGY

(71) Applicant: AIXMED, INC., Fremont, CA (US)

(72) Inventors: Samuel Chen, Fremont, CA (US); Tien-Jen Liu, Taipei (TW); Shih-Yu Chen, Taipei (TW)

(73) Assignee: AIXMED, INC., Fremont, CA (US)

( * ) Notice: Subject to any disclaimer, the term of this patent is extended or adjusted under 35 U.S.C. 154(b) by 586 days.

This patent is subject to a terminal disclaimer.

(21) Appl. No.: 17/855,794

(22) Filed: Jul. 1, 2022

(65) Prior Publication Data
US 2022/0405929 A1    Dec. 22, 2022

Related U.S. Application Data

(63) Continuation of application No. 17/602,278, filed as application No. PCT/US2021/034441 on May 27, 2021, now Pat. No. 11,416,990.
(Continued)

(51) Int. Cl.
*G06T 7/00*   (2017.01)
*G06T 7/11*   (2017.01)

(52) U.S. Cl.
CPC ............ *G06T 7/0012* (2013.01); *G06T 7/11* (2017.01); *G06T 2207/10056* (2013.01); *G06T 2207/20081* (2013.01); *G06T 2207/30024* (2013.01)

(58) Field of Classification Search
None
See application file for complete search history.

(56) References Cited

U.S. PATENT DOCUMENTS 8,009,189 B2    8/2011  Ortyn et al.
8,059,336 B2 *  11/2011 Ptitsyn ............... G01B 9/04
                                            359/383
(Continued)

FOREIGN PATENT DOCUMENTS

CN    104111242 B    8/2017
JP    2001-211896 A  8/2001
(Continued)

OTHER PUBLICATIONS

The Extended European Search Report, application No. 21880715.4, Jan. 22, 2024.
(Continued)

*Primary Examiner* — Samah A Beg
(74) *Attorney, Agent, or Firm* — SU IP CONSULTING

(57) ABSTRACT

Example methods and systems to obtain images associated with target cells distributed in a cytology specimen have been disclosed. One example method includes obtaining a first image associated with a first region of the cytology specimen through a first object lens, determining a first subregion of the first region, obtaining a second set of one or more images associated with the first subregion through a second object lens, identifying a third image from the first image, and in response to a ratio of a second number of the target cells in the second set of one or more images to the first number of the target cells in the third image being in a predetermined range, obtaining images associated with the target cells based on the second set of images.

20 Claims, 7 Drawing Sheets

Related U.S. Application Data

(60) Provisional application No. 63/093,444, filed on Oct. 19, 2020, provisional application No. 63/093,287, filed on Oct. 18, 2020.

(56) References Cited

U.S. PATENT DOCUMENTS

| 8,368,035 | B2 | 2/2013 | Seibel et al. | |
|---|---|---|---|---|
| 10,502,941 | B2 | 12/2019 | Zou et al. | |
| 10,890,750 | B2* | 1/2021 | Dowaki | G02B 21/365 |
| 11,416,990 | B1* | 8/2022 | Chen | G06V 10/993 |
| 2001/0050999 | A1* | 12/2001 | Bacus | G01N 15/1433 |
| | | | | 382/128 |
| 2004/0241677 | A1* | 12/2004 | Lin | G06T 7/0012 |
| | | | | 435/6.12 |
| 2009/0231689 | A1* | 9/2009 | Pittsyn | G01B 9/04 |
| | | | | 359/363 |
| 2010/0272334 | A1* | 10/2010 | Yamada | G01N 1/312 |
| | | | | 382/128 |
| 2014/0293117 | A1 | 10/2014 | Murakami | |
| 2015/0029326 | A1* | 1/2015 | Backman | G01J 3/1256 |
| | | | | 348/80 |
| 2016/0370569 | A1* | 12/2016 | Matsumoto | G01N 15/1433 |
| 2018/0129863 | A1* | 5/2018 | Backman | G02B 21/06 |
| 2020/0160032 | A1 | 5/2020 | Allen et al. | |

FOREIGN PATENT DOCUMENTS

| JP | 2005-519625 A | 7/2005 |
|---|---|---|
| JP | 2009-175334 A | 8/2009 |
| JP | 2014-228755 A | 12/2014 |
| JP | 2018-533116 A | 11/2018 |
| WO | 2018224852 A2 | 12/2018 |

OTHER PUBLICATIONS

International Search Report and Written Opinion of the International Searching Authority, International application No. PCT/US2021/034441, Sep. 21, 2021.

Bernd Lahrmann et al., "Semantic Focusing Allows Fully Automated Single-Layer Slide Scanning of Cervical Cytology Slides", Plos one 8.4, Apr. 2013, vol. 8, Issue 4, e61441.

Amber D. Donnelly et al., "Optimal Z-Axis Scanning Parameters for Gynecologic Cytology Specimens", Journal of pathology informatics 4, Dec. 31, 2013.

* cited by examiner

METHOD AND SYSTEM TO OBTAIN CYTOLOGY IMAGE IN CYTOPATHOLOGY

CROSS-REFERENCE TO RELATED APPLICATIONS

The present application is a continuation application of and claims priority under 35 U.S.C. § 120 to U.S. patent application Ser. No. 17/602,278, filed Oct. 7, 2021, which is a 371 application of International Application PCT/US2021/03441, filed May 27, 2021, which claims the benefits of U.S. Provisional Application No. 63/093,287 filed Oct. 18, 2020 and U.S. Provisional Application No. 63/093,444 filed Oct. 19, 2020. The U.S. Patent Application, U.S. Provisional Applications, and International Application are incorporated by reference in their entirety.

BACKGROUND OF THE INVENTION

Field of the Invention

Embodiments of the present invention generally relate to methods and systems to obtain cytology images in cytopathology.

Description of the Related Art

Unless otherwise indicated herein, the approaches described in this section are not prior art to the claims in this application and are not admitted to be prior art by inclusion in this section.

Cytopathology is a branch of pathology that studies and diagnoses diseases on a cellular level and generally involves obtaining cytology images on the cellular level. Obtaining cytology images of a cytology specimen includes an image digitalization of a glass slide on which the cytology specimen is distributed. The image digitalization may generally include scanning the glass slide for the cytology specimen to generate an image digital slide for the glass slide. The scanning may be performed by a whole-slide imaging scanner. The image digital slide can be viewed on a display (e.g., computer monitor) instead of a microscope.

Performing image digitalization of a glass slide efficiently and precisely can be challenging. One reason is that the cytology specimen on the glass slide may contain single cells and cell groups distributed in a three-dimensional manner. The three-dimensional distributions of the cells and cells groups in the cytology specimen cause focusing difficulties. One conventional way to address such focusing difficulties is to obtain focused images of the entire glass slide, which can be very time consuming. Another conventional way to address the focusing difficulties is to manually mark regions of the glass slide to be focused on and obtain focused images of the marked regions. However, the manual approach may mark incorrect regions and as a result, the obtained focused images may not include many target cells in the cytology specimen.

DETAILED DESCRIPTION

Figure 1:
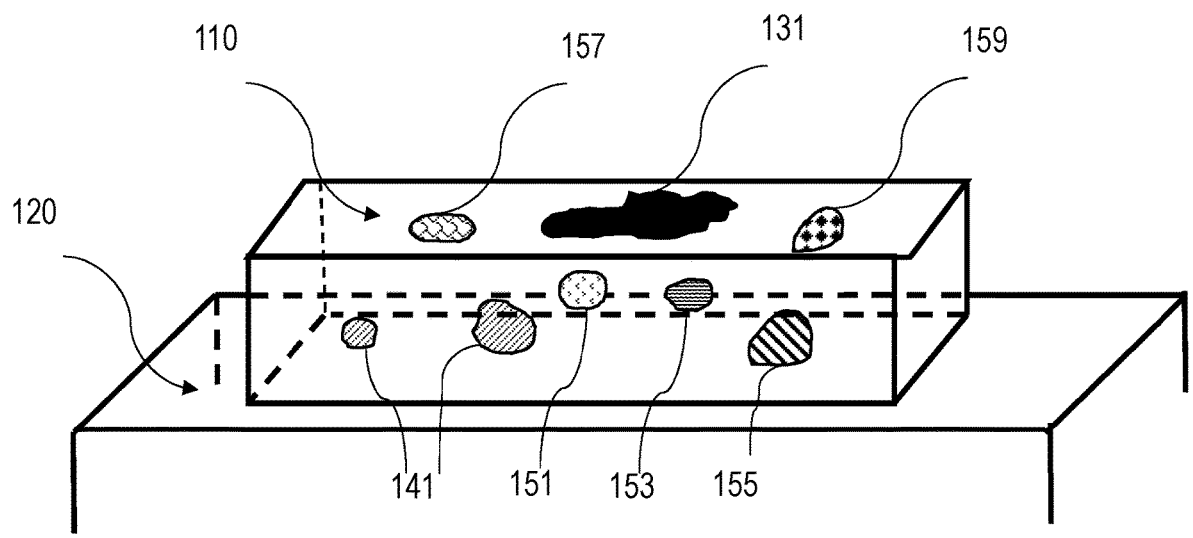
FIG. 1 is an example figure showing a cytology specimen distributed in a three-dimensional manner on glass slide.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated herein.

FIG. 1 is an example figure showing cytology specimen 110 distributed in a three-dimensional manner on glass slide 120, arranged in accordance with some embodiments of the present disclosure. Cytology specimen 110 may include multiple cells and impurities. For example, cytology specimen 110 may include dust or mark 131, target cells 141 (e.g., the Epithelial cells at malignant risk), non-target cells 151, 153, 155, 157 and 159 (e.g., red blood cells, normal Epithelial cells and other cells). Dust or mark 131, target cells 141 and non-target cells 151, 153, 155, 157 and 159 are distributed in a three-dimensional manner (i.e., at different depths within the volume of cytology specimen 110) on glass slide 120.

Figure 2:
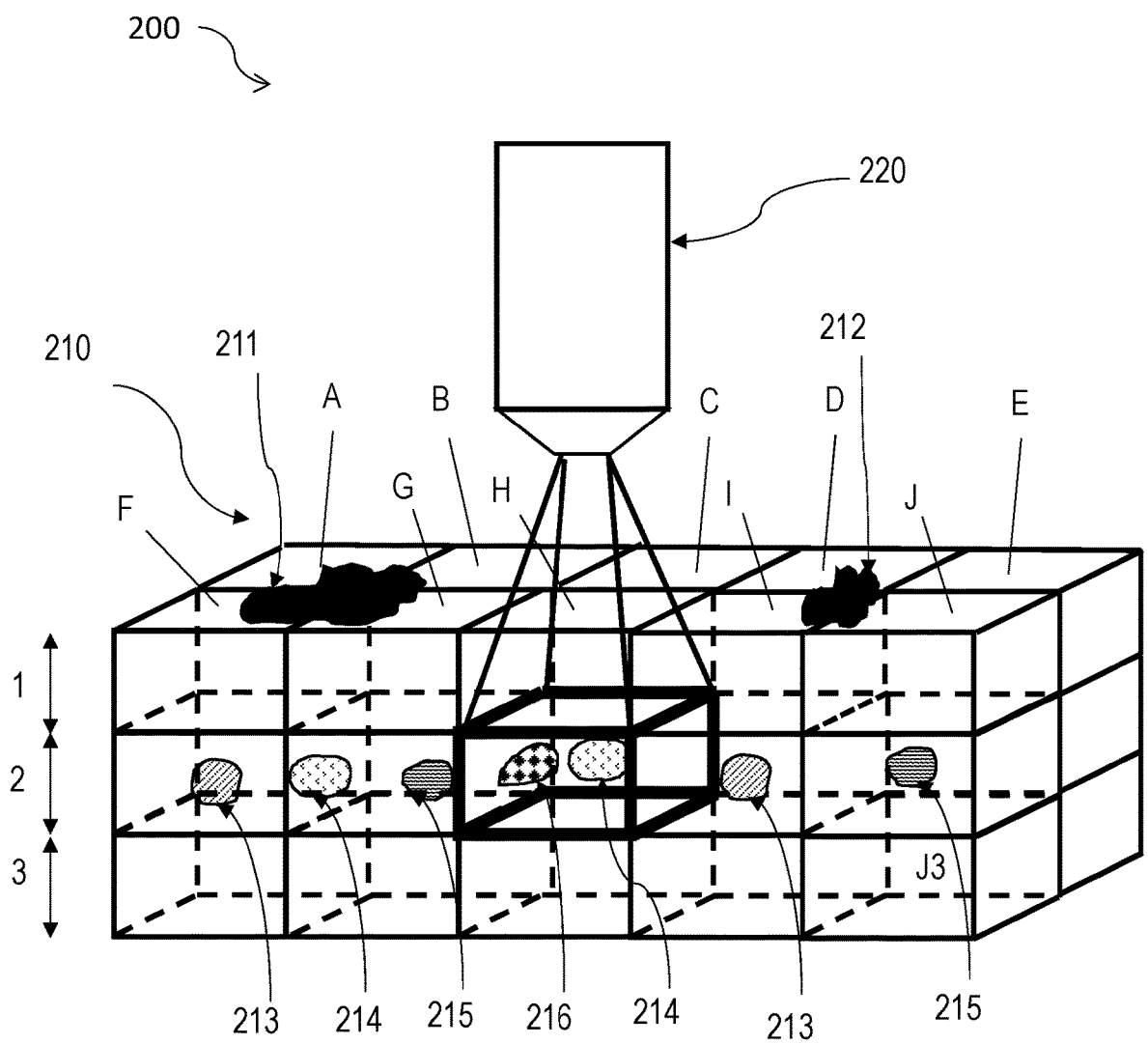
FIG. 2 illustrates how an example multiple object lens module obtains images associated with a layer of a cytology specimen by a first object lens.

FIG. 2 illustrates how an example multiple object lens module 200 obtains images associated with a layer of cytology specimen 210 by first object lens 220, arranged in accordance with some embodiments of the present disclosure. In conjunction with FIG. 1, in FIG. 2, cytology specimen 210 may correspond to cytology specimen 110. In FIG. 2, multiple object lens module 200 includes first object lens 220 configured to obtain images associated with cytology specimen 210. More specifically, first object lens 220 is configured to obtain images associated with one or more layers of cytology specimen 210. In some embodiments, each layer may correspond to a depth of field associated with a field of view of first object lens 220.

In some embodiments, first object lens 220 has a first field of view, a first depth of field and a first magnification. The first field of view may correspond to any of region A, B, C, D, E, F, G, H, I and J of cytology specimen 210.

In some embodiments, in the first field of view, a distance between a sharp and focused object nearest to first object lens 220 and a sharp and focused object furthest to first object lens 220 refers to the first depth of field. Some example distances may be distance 1, distance 2 and distance 3 illustrated in FIG. 2. The first depth of field may also correspond to a layer of cytology specimen 210. Therefore, distance 1 may correspond to the first layer of cytology specimen 210; distance 2 may correspond to the second layer of cytology specimen 210; and distance 3 may correspond to the third layer of cytology specimen 210.

The first layer may be a layer furthest away from a glass slide (e.g., glass slide 120) and the third layer may be a layer adjacent to the glass slide (e.g., glass slide 120). Noting that although FIG. 2 illustrates 3 layers, cytology specimen 210 may include more or less layers according to the first depth of field of first object lens 220. In these embodiments, a region and a distance may define a part of cytology specimen 210. For example, J3 corresponds to a front bottom right part of cytology specimen 210. Therefore, in one embodiment illustrated in FIG. 2, cytology specimen 210 may be defined by parts A1, A2, A3, B1, B2, B3, C1, C2, C3, D1, D2, D3, E1, E2, E3, F1, F2, F3, G1, G2, G3, H1, H2, H3, I1,I2,I3, J1, J2 and J3.

In some embodiments, cytology specimen 210 may include, but not limited to, dust 211, mark 212, first type of cells 213 (e.g., the Epithelial cell at malignant risk), second type of cells 214 (e.g., red blood cell), third types of cells 215 (e.g., normal Epithelial cell) and fourth types of cells 216 (e.g., other cells). Dust 211, first type of cells 213, second type of cells 214, third types of cells 215 and fourth types of cells 216 may be distributed in cytology specimen 210 based on their specific gravities. Mark 212 may be manually marked by a user on a top surface of cytology specimen 210. Dust 211 and cells 213, 214, 215 and 216 have significant differences in their specific densities and may be distributed in different layers of cytology specimen 210. For example, dust 211 has a smaller specific density than cells 213, 214, 215 and 216 and may be distributed in the first layer of cytology specimen 210. Cells 213, 214, 215 and 216 have specific densities that are larger than dust 211 and may be distributed in the second layer of cytology specimen 210.

In some embodiments, cells 213, 214, 215 and 216 in cytology specimen 210 usually have sizes in a range of around 5 micrometres to around 20 micrometres. It should be noted that a selection of first object lens 220 may be based on the first depth of field of first object lens 220. The first depth of field of first object lens 220 may be much larger than the sizes of cells 213, 214, 215 and 216 in cytology specimen 210 so that the images of cells 213, 214, 215 and 216 are likely to be obtained in the same first depth of field (e.g., distance 1, distance 2 or distance 3).

In some embodiments, prior to obtaining images of an entire layer of cytology specimen 210 through first object lens 220, first object lens 220 is configured to obtain images of each layer (e.g., first layer, second layer and third layer) of several regions randomly selected from all regions A, B, C, D, E, F, G, H, I and J. For example, first object lens 220 may be configured to obtain images of parts H1, H2 and H3 in the randomly selected region H. Here, region H corresponds to the first field of view of first object lens 220, and distance 1, 2 or 3 corresponds to the first depth of field of object lens 200. Several regions other than region H may be also randomly selected, for example, regions F, I and J.

Accordingly, first object lens 220 may also obtain images of parts F1, F2, F3, I1, I2, I3, J1, J2 and J3 of cytology specimen 210.

In some embodiments, images of parts F1, F2, F3, H1, H2, H3, I1, I2, I3, J1, J2 and J3 are processed by a processor with an artificial intelligent engine to identify whether the images of parts F1, F2, F3, H1, H2, H3, I1,I2,I3, J1, J2 and J3 include images of cells 213, 214, 215 and 216. The artificial intelligent engine may include machine learning capabilities. The artificial intelligent engine may be trained based on sample images of known cells corresponding to cells 213, 214, 215 and 216 having various contrasts, lightness, shapes and other image characteristics. In some embodiments, for illustration purposes only, the artificial intelligent engine may identify images of cells 213, 214, 215 and 216 that are mostly included in images of parts F2, H2, 12 and J2, instead of being included in images of parts F1, F3, H1, H3, I1, I3, J1 and J3. Accordingly, the artificial intelligent engine may conclude that cells 213, 214, 215 and 216 are distributed in the second layer of cytology specimen 210. After reaching such a conclusion, first object lens 220 is configured to obtain images of the entire second layer of cytology specimen 210 (i.e., images of parts A2, B2, C2, D2, E2, F2, G2, H2, 12 and J2).

Figure 3A:
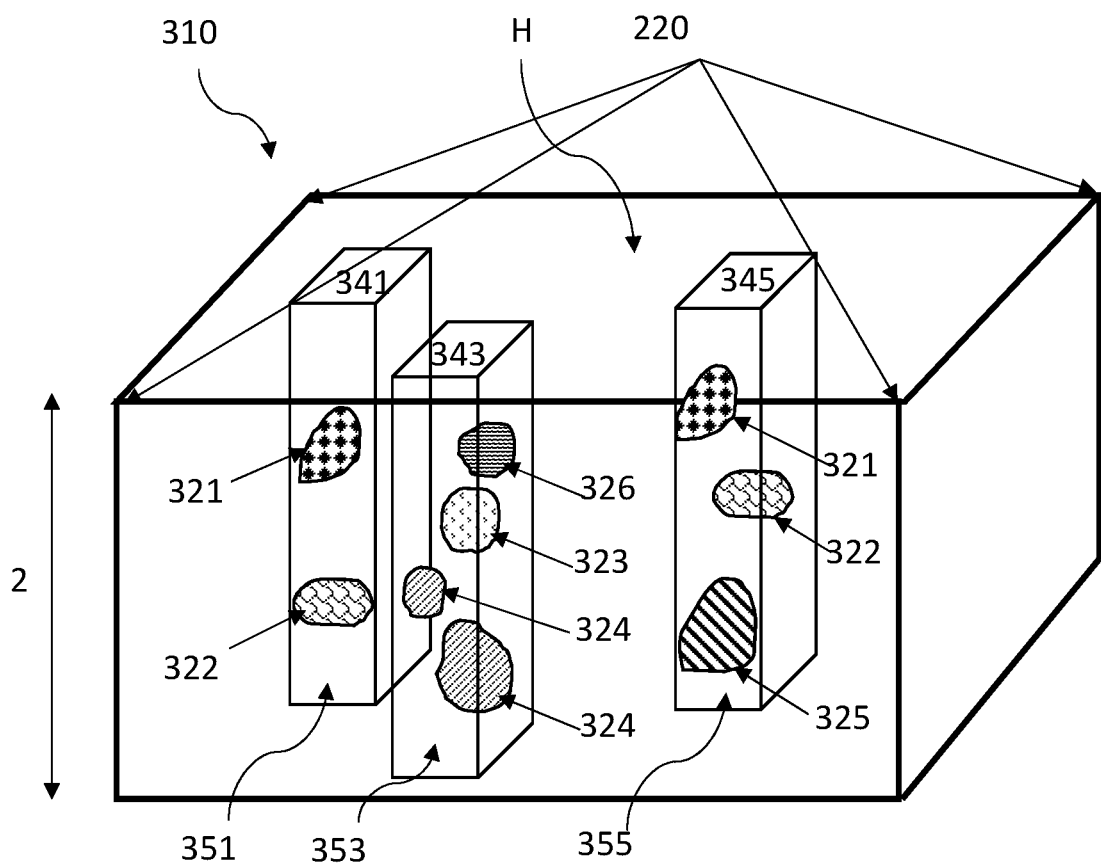
FIG. 3A is an example figure illustrating a part of cytology specimen.
Figure 3B:
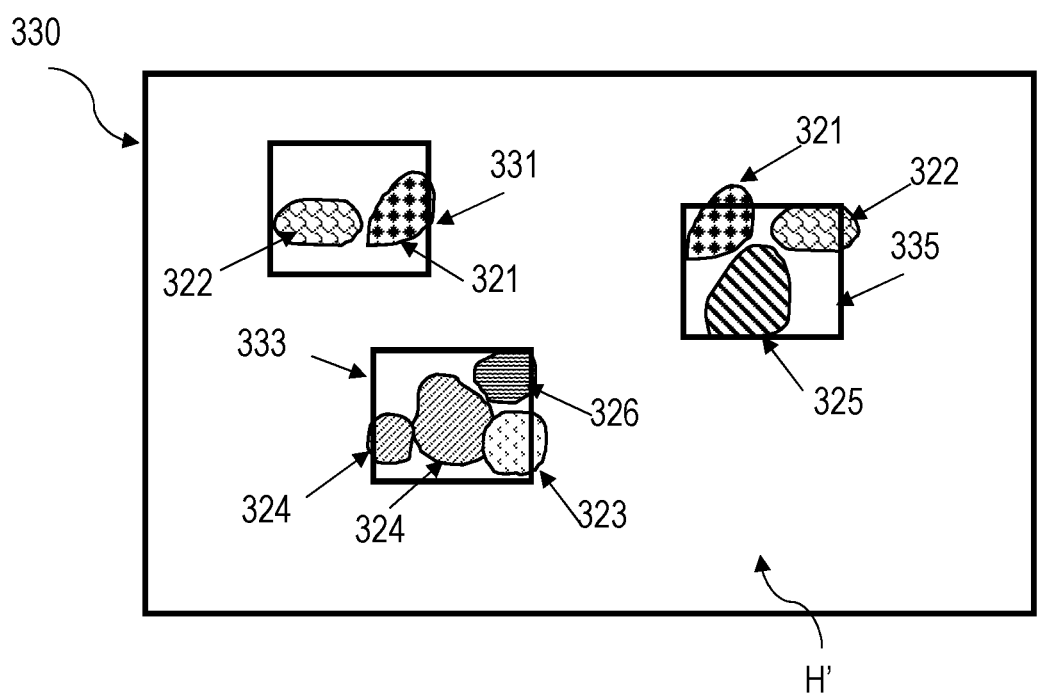
FIG. 3B illustrates an image associated with a part of cytology specimen obtained by first object lens.

In conjunction with FIG. 2, FIG. 3A is an example figure illustrating a part 310 of cytology specimen 210, and FIG. 3B illustrates an image 330 associated with part 310 obtained by first object lens 220, arranged in accordance with some embodiments of the present disclosure. In some embodiments, part 310 may correspond to part H2 of cytology specimen 210. Cells 321, 322, 323, 324, 325 and 326 may be distributed in part 310. In some embodiments, cells 324 may be the Epithelial cells at malignant risk and cells 321, 322, 323, 325 and 326 may include normal Epithelial cells, red blood cells and other cells.

In some embodiments, image 330 may be a top view of part 310 because first object lens 220 is disposed at the top of part 310. Image 330 in FIG. 3B has an image region H' corresponding to region H associated with part 310 in FIG. 3A. The correspondence between region H and image region H' may include one or more factors associated with enlargement, shrinkage, rotation or twisted.

In some embodiments, the artificial intelligent engine set forth above is used to process image 330 based on contrasts, lightness, shapes and other image characteristics associated with cells 321 to 326 to identify images 331, 333 and 335 of image 330 which include images of cells 321 to 326. For example, images associated with cells 321 and 322 are identified to be included in image 331, images associated with cells 323, 324 and 326 are identified to be included in image 333 and images associated with cells 321, 322 and 325 are identified to be included in image 335. Any of images 331, 333 and 335 has a spatial relationship in image region H' of image 330. Based on the spatial relationship between images 331, 333, 335 and image region H', and the correspondence between image region H' and region H, referring back to FIG. 3A, subregions 341, 343 and 345 in region H may be identified. In some embodiments, subregions associated with cells respectively distributed in any of part A2, B2, C2, D2, E2, F2, G2, 12 and J2 may be identified in a similar manner.

In some embodiments, subparts 351, 353 and 355 of part 310 are defined by distance 2 and subregions 341, 343 and 345, respectively. Subparts 351, 353 and 355 are further examined with a second object lens to obtain more detailed images associated with cells 321 to 326. In some embodiments, as set forth above, cells 324 may be the Epithelial cells at malignant risk (i.e., target cells) and cells 321, 322, 323, 325 and 326 may include normal Epithelial cells, red blood cells and other cells (i.e., non-target cells), subpart associated with the target cells (i.e., subpart 353) may be examined in more details than subparts associated with the non-target cells (i.e., subparts 351 and 355). For example, the second object lens is configured to obtain images associated with subpart 353 in more depths of field than subparts 351 and 355. For example, the second object lens may obtain images associated with subpart 353 in different two depths of field while obtaining an image associated with subpart 351 in one single depth of field and an image associated with subpart 355 in one single depth of field.

In some embodiments, as set forth above, subparts of parts A2, B2, C2, D2, E2, F2, G2, 12 and J2 may also be further examined with the second object lens to obtain more detailed images associated with cells 321 to 326.

Figure 4A:
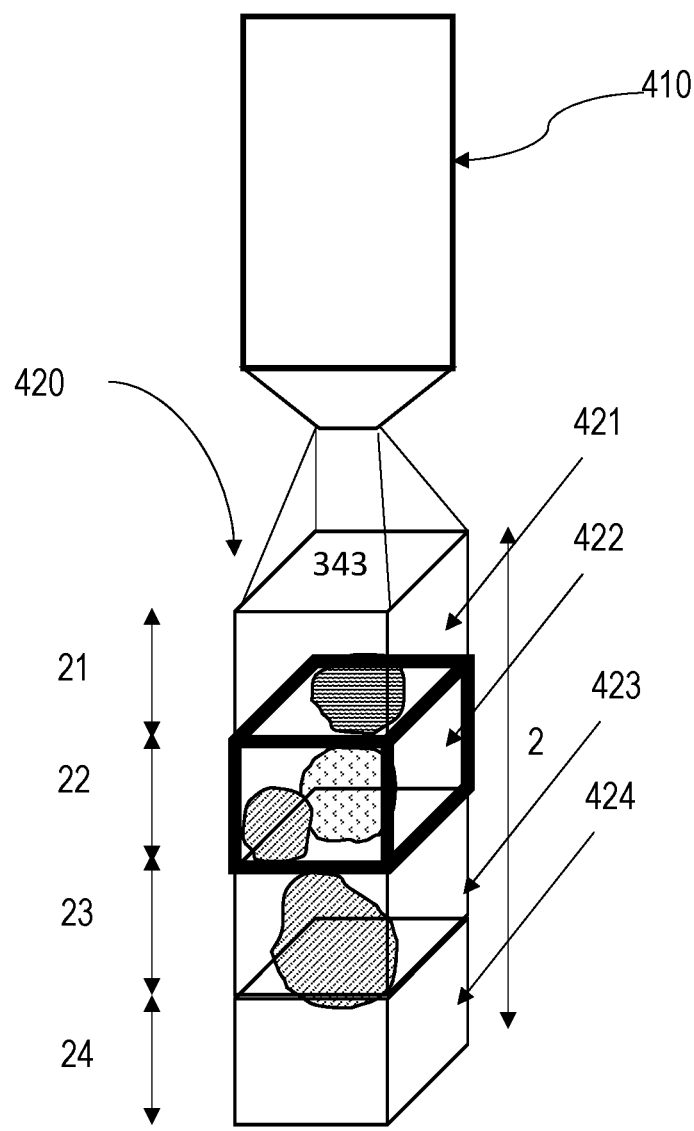
FIG. 4A illustrates how an example multiple object lens module obtains images associated with a secondary subpart of a cytology specimen by a second object lens.

FIG. 4A illustrates how an example multiple object lens module obtains images associated with a secondary subpart of a cytology specimen by a second object lens, arranged in accordance with some embodiments of the present disclosure. In FIG. 4A, second object lens 410 of the multiple object lens module is configured to obtain one or more images associated with subpart 420. In conjunction with FIG. 3A, subpart 420 may correspond to subpart 353 defined by distance 2 and subregion 343.

In some embodiments, second object lens 410 has a second field of view, a second depth of field and a second magnification. In some embodiments, in conjunction with FIG. 3A, the second field of view may correspond to subregion 343. In some other embodiments, in conjunction with FIG. 3A, the second field of view may correspond to only a part of subregion 343. For illustration only, FIG. 4A illustrates that the second field of view corresponds to subregion 343.

In some embodiments, the second magnification is higher than the first magnification. For illustration only, the first magnification and the second magnification may be, but not limited to, 4× and 20×, respectively.

In some embodiments, the second depth of field is less than the first depth of field. For illustration only, the first depth of field and the second depth of field may be, but not limited to, around 50 micrometres and around 1 micrometre, respectively. In some embodiments, in the second field of view, a distance between a sharp and focused object nearest to second object lens 410 and a sharp and focused object furthest to second object lens 410 refers to the second depth of field. Some example distance may be distance 21, distance 22, distance 23 or distance 24 of distance 2 illustrated in FIG. 4A. Distance 2 illustrated in FIG. 4A corresponds to same distance 2 illustrated in FIG. 2 and FIG. 3A.

In some embodiments, the second depth of field may also correspond to a sublayer of a layer (e.g., second layer defined by distance 2 illustrated in FIG. 2) of cytology specimen 210. Therefore, distance 21 may correspond to a first sublayer of the second layer of cytology specimen 210, distance 22 may correspond to a second sublayer of the second layer cytology specimen 210, distance 23 may correspond to a third sublayer of the second layer of cytology specimen 210 and distance 24 may correspond to a fourth sublayer of the second layer of cytology specimen 210. Noting the number of sublayers of 4 is only for illustration and may include more or less sublayers according to the second depth of field of second object lens 410.

In some embodiments, second object lens 410 is configured to obtain images associated with subpart 420. More specifically, second object lens 410 is configured to obtain images of secondary subparts 421, 422, 423 and/or 424 of subpart 420. In some embodiments, second object lens 410 is configured to focus on secondary subpart 421, subpart 422, subpart 423 and/or subpart 424 with the second depth of field.

In some embodiments, the focus may be based on a determination of an artificial intelligent engine. The artificial intelligent engine may include machine learning capabilities. For example, the artificial intelligent engine may be trained based on sample images of target cells (e.g., the Epithelial cells at malignant risk) having various contrasts, lightness, shapes and other image characteristics. Accordingly, the artificial intelligent engine may identify images of the target cells and determine to focus on these identified images. For example, among images of secondary subparts 421, 422, 423 and 424 obtained by the second object lens 410, the artificial intelligent engine may identify images of secondary subparts 422 and 423 include images of the target cells. Based on the determination made by the artificial intelligent engine, the second object lens 410 is then driven to focus on secondary subparts 422 and 423 and save images of secondary subparts 422 and 423.

In alternative embodiments, the focus may be based on image characteristics of target cells (e.g., the Epithelial cells at malignant risk). Such image characteristics may include, but not limited to, color information associated with the target cells. For example, the nuclei of an Epithelial cell may be stained to blue by hematoxylin while red blood cells maintain red because red blood cells have no nuclei to be stained. Accordingly, focusing on blue parts, instead of red parts, in the image have a higher chance to obtain images of the target cells.

In some embodiments, images of target cells may include a first specific range in the RGB (Red, Green, Blue) domain or in the HSV (Hue, Saturation, Value) domain. For example, the first specific range may include a range of R, G and B values, respectively. Alternatively, the first specific range may include a range of Hue value. On the other hand, images of non-target cells (e.g., normal Epithelial cells, red blood cells or other cells) may include a second specific range in the RGB (Red, Green, Blue) domain or in the HSV (Hue, Saturation, Value) domain, which is different from the first specific range. For example, the second specific range may include another range of R, G and B values. Alternatively, the second specific range may include another range of Hue value. For example, among images of secondary subparts 421, 422, 423 and 424 obtained by the second object lens 410, images of secondary subparts 422 and 423 may include the first specific range. Accordingly, the second object lens 410 is then configured to focus on secondary subparts 422 and 423 and save images of secondary subparts 422 and 423.

Figure 4B:
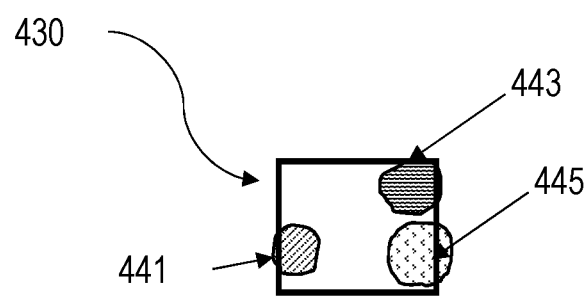
FIG. 4B illustrates an image associated with secondary subpart obtained by second object lens.

FIG. 4B illustrates an image 430 associated with secondary subpart 422 obtained by second object lens [[220]] 410, arranged in accordance with some embodiments of the present disclosure. Image 430 includes images of target cell 441 and non-target cells 443 and 445. Image of target cell 441 includes the first specific range in the RGB domain or in the HSV domain and images of non-target cells 443 and 445 include the second specific range in RGB domain or in HSV domain. The first specific range in the RGB domain or in the HSV domain associated with image of target cell 441 causes second object lens 410 to focus on secondary subpart 422.

In some embodiments, in conjunction with FIGS. 2 and 3A, image 430 obtained by second object lens [[420]] 410 is compared to image 333 obtained by first object lens 220 to determine whether a ratio of a number of target cells in image 430 to a number of target cells in image 333 is in a predetermined range. In conjunction with FIG. 3A, in response to the ratio being in the predetermined range, it may indicate that image 430 obtained by second object lens 410 has captured most target cells in subpart 353.

FIG. 4B illustrates an image 430 associated with secondary subpart 422 obtained by second object lens 410, arranged in accordance with some embodiments of the present disclosure. Image 430 includes images of target cell 441 and non-target cells 443 and 445. Image of target cell 441 includes the first specific range in the RGB domain or in the HSV domain and images of non-target cells 443 and 445 include the second specific range in RGB domain or in HSV domain. The first specific range in the RGB domain or in the HSV domain associated with image of target cell 441 causes second object lens 410 to focus on secondary subpart 422.

In some embodiments, in conjunction with FIGS. 2 and 3A, image 430 obtained by second object lens 410 is compared to image 333 obtained by first object lens 220 to determine whether a ratio of a number of target cells in image 430 to a number of target cells in image 333 is in a predetermined range. In conjunction with FIG. 3A, in response to the ratio being in the predetermined range, it may indicate that image 430 obtained by second object lens 410 has captured most target cells in subpart 353.

In some embodiments, in conjunction with FIG. 3A, in response to the ratio not being in the predetermined range, it may indicate that image 430 obtained by second object lens 410 has not captured most target cells in subpart 353. Therefore, second object lens 410 is further configured to focus on another secondary subpart (e.g., secondary subpart 423) adjacent to secondary subpart 422 and obtain and save an image associated with secondary subpart 423.

Figure 4C:
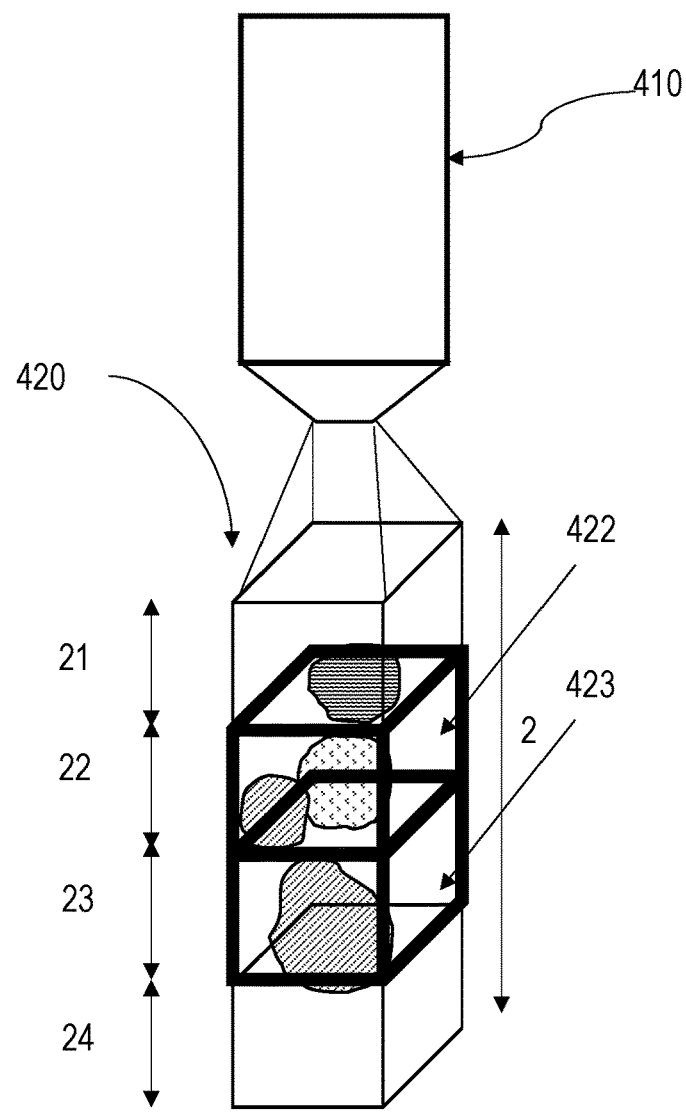
FIG. 4C illustrates how an example multiple object lens module obtains images associated with a plurality of secondary subparts of a cytology specimen by a second object lens.
Figure 4D:
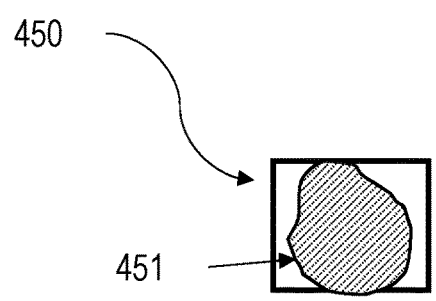
FIG. 4D illustrates an image associated with secondary subpart obtained by second object lens.

FIG. 4C illustrates how an example multiple object lens module obtains images associated with a plurality of secondary subparts (e.g., secondary subparts 422 and 423) of a cytology specimen by a second object lens and FIG. 4D illustrates an image 450 associated with secondary subpart 423 obtained by second object lens 410, arranged in accordance with some embodiments of the present disclosure. Image 450 includes an image of target cell 451. Image of target cell 451 may include the first specific range in RGB domain or in HSV domain.

In some embodiments, in conjunction with FIGS. 2 and 3A, images 430 and 450 obtained by second object lens 410 of the multiple object lens module are compared to image 333 obtained by first object lens 220 to determine whether a ratio of a number of target cells in images 430 and 450 to a number of target cells in image 333 is in a predetermined range. In conjunction with FIG. 3A, in response to the ratio being in the predetermined range, it may indicate that images 430 and 450 obtained by second object lens 410 have captured most target cells in subpart 353.

In some embodiments, in conjunction with FIGS. 2 and 3A, images 430 and 450 obtained by second object lens 420 of the multiple object lens module are compared to image 333 obtained by first object lens 220 to determine whether a ratio of a number of target cells in images 430 and 450 to a number of target cells in image 333 is in a predetermined range. In conjunction with FIG. 3A, in response to the ratio being in the predetermined range, it may indicate that images 430 and 450 obtained by second object lens 410 have captured most target cells in subpart 353.

In response to the ratio not being in the predetermined range, it may indicate that images 430 and 450 obtained by second object lens 410 have not captured most target cells in subpart 353. Then second object lens 410 is configured to focus on another secondary subpart (e.g., secondary subpart 421) adjacent to subpart 422 and obtain and save an image associated with secondary subpart 421. The process above may be repeated until a ratio of a number of target cells in images obtained by second object lens 410 to a number of target cells in image 333 is in the predetermined range.

In some embodiments, similarly, in conjunction with FIG. 3A, second object lens 410 is configured to obtain images associated with other subparts (e.g., subparts 351 and 355 in FIG. 3A). As set forth above, second object lens 410 may be configured to obtain less images associated with other subparts (e.g., subparts 351 and 355 in FIG. 3A) than images associated with subpart 353/420 including the target cells. For example, compared to images 430 and 450 obtained by second object lens 410, second object lens 410 is configured to obtain an image of one single secondary subpart of subpart 351 and an image of one single secondary subpart of subpart 355.

Figure 5:
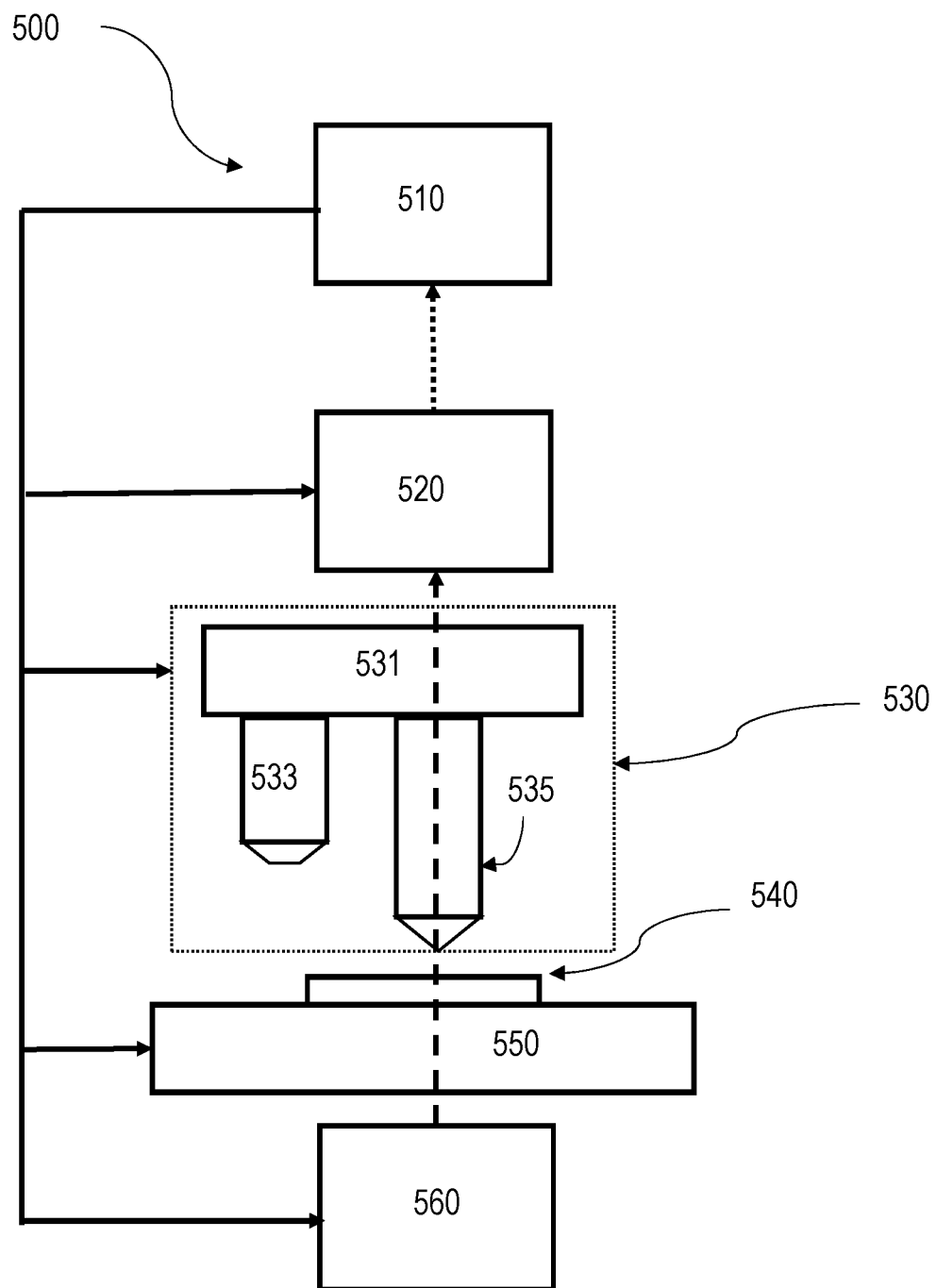
FIG. 5 illustrates an example system to obtain images associated with a cytology specimen.

FIG. 5 illustrates an example system 500 to obtain images associated with a cytology specimen, arranged in accordance with some embodiments of the present disclosure. System 500 includes, but not limited to, computing device 510, camera 520, multiple object lens module 530, stage 550 and light source 560. In some embodiments, stage 550 is configured to carry and move a glass slide. Cytology specimen 540 is distributed on the glass slide.

In some embodiments, computing device 510 includes a processor, a memory subsystem, and a communication subsystem. Artificial intelligence engines discussed above may be implemented as a set of executable instructions stored in the memory subsystem to be executed by the processor.

In some embodiments, computing device 510 is configured to generate control signals and transmit the control signals to camera 520, multiple object lens module 530, stage 550 and light source 560 via the communication subsystem. For example, computing device 510 is configured to control light source 560 to generate lights with a specific range of wavelengths associated with image characteristics of target cells distributed in cytology specimen 540. For example, the specific range of wavelengths may correspond to the color information associated with the target cells as set forth above. An example specific range of wavelengths may be about 530 nm to about 630 nm. Alternatively, another example specific range of wavelengths may be about 450 nm to about 560 nm, and preferably about 450 nm to about 530 nm.

In some embodiments, computing device 510 is configured to control a movement of stage 550. When stage 550 carries the glass slide and cytology specimen 540, the movement of stage 550 may align a region (e.g., region A, B, C, D, E, F, G, H, I or J illustrated in FIG. 2 or subregion 341, 343 or 345 in FIG. 3A) of cytology specimen 540 and a field of view of object lens 533 or 535 with a light path of the light generated by light source 560 and illustrated in FIG. 5. Therefore, the light generated by light source 560 may pass through the region and object lens 533 or 535 and reach camera 520.

In some embodiments, computing device 510 is configured to control lens switching module 531 of multiple object lens module 530 to switch between different object lens (e.g., object lens 533 and 535). In some other embodiments, computing device 510 is configured to control camera 520, multiple object lens module 530 and/or stage 550 to move so that object lens 533 or object lens 535 to focus on parts, subparts and/or secondary subparts of cytology specimen 540. In conjunction with FIG. 2, object lens 533 may correspond to first object lens 220. In conjunction with FIG. 4A, object lens 555 may correspond to second object lens 410.

In some embodiments, computing device 510 is configured to control camera 520 to obtain an image of a focused part of cytology specimen 540. Computing device 510 is also configured to control camera 520 to send the obtained image to computing device 510 for further processing. Such processing includes, but not limited to, identifying images associated with target cells or non-target cells in cytology specimen 540, comparing one or more images obtained by second object lens 535 to an image obtained by first object lens 533 to determine whether a ratio of a number of target cells in the images obtained by second object lens 535 to a number of target cells in the image obtained by first object lens 533 is in a predetermined range.

Figure 6:
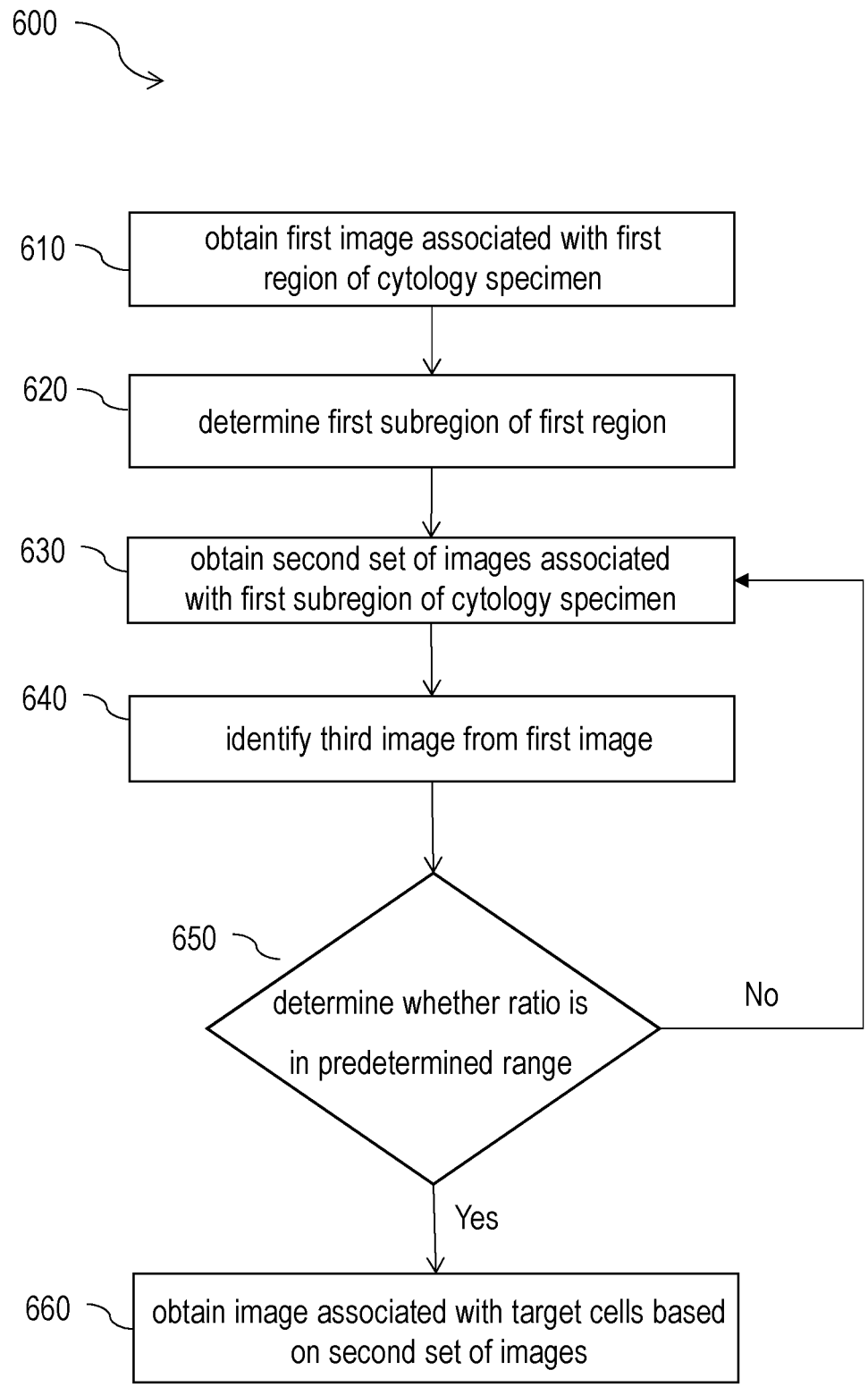
FIG. 6 is a flow diagram illustrating an example process to obtain images associated with target cells distributed in a cytology specimen, all arranged in accordance with some embodiments of the present disclosure.

FIG. 6 is a flow diagram illustrating an example process 600 to obtain images associated with target cells distributed in a cytology specimen, arranged in accordance with some embodiments of the present disclosure. Process 600 may include one or more operations, functions, or actions as illustrated by blocks 610, 620, 630, 640, 650 and/or 660 which may be performed by hardware, software and/or firmware. The various blocks are not intended to be limiting to the described embodiments. The outlined steps and operations are only provided as examples, and some of the steps and operations may be optional, combined into fewer steps and operations, or expanded into additional steps and operations without detracting from the essence of the disclosed embodiments. Although the blocks are illustrated in a sequential order, these blocks may also be performed in parallel, and/or in a different order than those described herein.

Process 600 may begin at block 610, "obtain first image associated with first region of cytology specimen." In some embodiments, in conjunction with FIG. 2 and FIG. 5, processor 510 is configured to control a movement of stage 550 so that a first region (e.g., region H in FIG. 2) of cytology specimen 210 is aligned with a first field of view of first object lens 220/533. Processor 510 is configured to control light source 560 to generate lights with a specific range of wavelengths corresponding to the color information associated with target cells as set forth above in cytology specimen 210. An example specific range of wavelengths may be about 530 nm to about 630 nm. Alternatively, another example specific range of wavelengths may be about 450 nm to about 560 nm, and preferably about 450 nm to about 530 nm. The lights may pass through the first region and first object lens 220/533. Processor 510 is configured to control camera 520 to obtain images associated with the first region through first object lens 220/533.

In some embodiments, first object lens 220/533 has a first depth of field in the first field of view. The first depth of field may be less than a thickness of cytology specimen 210. Therefore, to obtain sharp and focused images associated with the entire first region, camera 520 is configured to sequentially obtain images of different layers in the first region of cytology specimen 210 according to the first depth of field. For example, in conjunction with FIG. 2, camera 520 is configured to sequentially obtain images of parts H1, H2 and H3. In some embodiments, processor 510 is configured to identify target cells and/or non-target cells from images of parts H1, H2 and H3 based on contrasts, lightness, shapes and other image characteristics associated with the target cells in cytology specimen 210.

Block 610 may be repeated to perform on different regions (e.g., regions F, I and J in FIG. 2) of the cytology specimen. For example, processor 510 is configured to additionally obtain images of parts F1, F2, F3, I1,12,13, J1, J2 and J3 of cytology specimen 210 and identify target cells and/or non-target cells from images of F1, F2, F3, I1, I2, I3, J1, J2 and J3 based on contrasts, lightness, shapes and other image characteristics associated with the target cells and/or non-target cells in cytology specimen 210.

In some embodiments, in response to target cells are identified to be mostly dispersed in a specific layer (e.g., second layer) in the regions (e.g., regions F, H, I and J) of cytology specimen 210, processor 510 is configured to obtain a first image (e.g., image of part H2) associated with respective region (e.g., region H) of cytology specimen. Eventually, for example, processor 510 is configured to obtain images of A2, B2, C2, D2, E2, F2, G2, H2, I2 and J2 associated with regions A, B, C, D, E, F, G, H, I and J, respectively.

Block 610 may be followed by block 620, "determine first subregion of first region." In some embodiments, processor 510 is configured to sequentially identify images associated with the target cells and/or the non-target cells from images of A2, B2, C2, D2, E2, F2, G2, H2, I2 or J2. For example, in conjunction with FIG. 3A and FIG. 3B, processor 510 is configured to identify images 331, 333 and 335. Images associated with cells 321 and 322 are identified to be included in image 331, images associated with cells 323, 324 and 326 are identified to be included in image 333 and images associated with cells 321, 322 and 325 are identified to be included in image 335. As previously discussed, based on spatial relationships between images 331, 333, 335 and image region H', and a correspondence between image region H' and region H, subregions 341, 343 and 345 in region H may be identified. In conjunction with FIG. 2, block 620 may be repeated to perform on other images (e.g., images of A2, B2, C2, D2, E2, F2, G2, I2 and J2) associated with other regions (e.g., regions A, B, C, D, E, F, G, I and J) of cytology specimen 210. Therefore, subregions of region A, B, C, D, E, F, G, I and J associated with the target cells and/or the non-target cells may also be determined in block 620.

Block 620 may be followed by block 630, "obtain second set of images associated with first subregion of cytology specimen." In some embodiments, in conjunction with FIG. 3A, as previously discussed, a second object lens is configured to obtain more detailed images of cells 321 to 326 in first subregions 341, 343 and 345. In some embodiments, in conjunction with FIG. 4A and FIG. 5, processor 510 is configured to control a movement of stage 550 so that a first subregion (e.g., subregion 343 in FIG. 4A) of the cytology specimen is aligned with a second field of view of second object lens 410/535. Processor 510 is configured to control light source 560 to generate lights with a specific range of wavelengths corresponding to the color information associated with target cells as set forth above in the cytology specimen. An example specific range of wavelengths may be about 530 nm to about 630 nm. Alternatively, another example specific range of wavelengths may be about 450 nm to about 560 nm, and preferably about 450 nm to about 530 nm. The lights may pass through the first subregion and second object lens 410/535. Processor 510 is configured to control camera 520 to obtain a second set of images associated with the first subregion through second object lens 410/535. The second set of images may include one or more images of secondary subparts 421, 422, 423 and 424 of subpart 420.

In some embodiments, in conjunction with FIG. 4A and FIG. 5, processor 510 is configured to control second object lens 410/535 to focus and obtain the second set of images based on image characteristics of target cells, for example, color information associated with the target cells. For example, the second set of images (e.g., image of secondary subpart 422, meaning image 430) includes the color information associated with the target cells but images associated with first subregion 343 other than the second set of images (e.g., images of secondary subparts 421, 423 and 424) do not include the color information associated with the target cells.

Block 630 may be followed by block 640 "identify third image from first image." In some embodiments, in conjunction with FIG. 3A and 5, processor 510 is configured to identify third image 333 from image 330 based on contrasts, lightness, shapes and other image characteristics associated with cells 321 to 326. Noting that third image 333 is a subset of first image 330 obtained through first object lens 220/533 and includes images of target cells distributed in subpart 353 defined by distance 2 and subregion 343.

Block 640 may be followed by block 650 "determine whether ratio is in predetermined range." In some embodiments, in conjunction with FIG. 3B and FIG. 4B, the ratio may be a ratio of a number of target cells in the second set of images discussed above (e.g., one or more images of secondary subparts 421, 422, 423 and 424, image 430) to a number of target cells in the third image (e.g., image 333). In some embodiments, as discussed above, in conjunction with FIG. 3A and 4A, the second set of images (e.g., image of secondary subpart 422, image 430) is an image of subset of subpart 420/353. Therefore, the third image (e.g., image 333) of subpart 353 should include images of target cells not less than the second set of images (e.g., image 430).

In response to the ratio in the predetermined range, block 650 may be followed by block 660 "obtain image associated with target cells based on second set of images." In response to the ratio being in the predetermined range, it may indicate that the second set of images (e.g., image 430) obtained by second object lens 410 include images of most target cells in subpart 353. Therefore, images associated with target cells may be obtained based on the second set of images. In some embodiments, for illustration only, the predetermined range is between around 50% and around 200%.

In response to the ratio not being in the predetermined range, block 640 may return to block 630. In conjunction with FIG. 3A, FIG. 4A and FIG. 4B, it may indicate that the second set of images (e.g., image 430) obtained by second object lens 410 do not include images of most target cells in subpart 353. Block 650 may be followed by block 630 to obtain additional image(s) associated with first subregion to be included in the second set of images. For example, in conjunction with FIG. 4A and FIG. 5, processor 510 is configured to control second object lens 410 to focus on another secondary subpart (e.g., subpart 423) adjacent to secondary subpart 422, obtain an image associated with secondary subpart 423 (i.e., image 450) and include image 450 in the second set of images.

The above examples can be implemented by hardware (including hardware logic circuitry), software or firmware or a combination thereof. The above examples may be implemented by any suitable computing device, computer system, wearables, etc. The computing device may include processor(s), memory unit(s) and physical NIC(s) that may communicate with each other via a communication bus, etc. The computing device may include a non-transitory computer-readable medium having stored thereon instructions or program code that, in response to execution by the processor, cause the processor to perform processes described herein with reference to FIGS. 2, 3, 5, and 6. For example, a computing device may communicate with a wearable and/or one or more sensors.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

Some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware are possible in light of this disclosure.

Software and/or other instructions to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.)

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting.

We claim:

1. A method to obtain images associated with target cells distributed in a three-dimensional manner in a cytology specimen, comprising:
    obtaining a first image associated with a first region of the cytology specimen through a first object lens having a first field of view and a first depth of field in the first field of view, wherein a first layer of the cytology specimen corresponds to the first depth of field;
    determining a first subregion of the first region based on image characteristics associated with the target cells, wherein a first number of the target cells are distributed in a first space defined by the first subregion and the first depth of field, wherein the first space is associated with the first layer;
    obtaining a second set of one or more images associated with the first subregion through a second object lens having a second field of view and a second depth of field in the second field of view, wherein the second depth of field corresponds to a sublayer of the first layer;

identifying a third image from the first image based on image characteristics associated with the target cells, wherein the third image is associated with the first subregion and covers the first number of the target cells; and obtaining images associated with the target cells based on the second set of one or more images in response to a comparison result between the second set of one or more images and the third image.

2. The method of claim 1, wherein determining the first subregion further comprises identifying the target cells from the first image based on the image characteristics.

3. The method of claim 1, wherein the image characteristics associated with the target cells include contrast, lightness, shape, and color information associated with the target cells.

4. The method of claim 3, wherein the color information corresponds to lights with a first range of wavelengths from about 530 nm to about 630 nm, a second range of wavelengths from about 450 nm to about 560 nm or a third range of wavelengths from about 450 nm to 530 nm.

5. The method of claim 3, wherein the color information includes a range of Red (R), Green (G), and Blue (B) values in an RGB domain or a range of Hue values in an HSV (Hue, Saturation, Value) domain.

6. The method of claim 1, wherein the second depth of field is less than the first depth of field.

7. The method of claim 1, wherein the second set of one or more images correspond to images obtained from different sublayers in the field of view.

8. The method of claim 1, wherein the third image is a subset of the first image.

9. The method of claim 1, wherein the comparison is associated with a ratio of a second number of the target cells in the second set of one or more images to the first number of the target cells in the third image being in a predetermined range.

10. The method of claim 1, wherein the second field of view corresponds to one or more parts of the first subregion.

11. The method of claim 1, prior to obtaining the first image, further comprising:
 obtaining images associated with other regions of the cytology specimen through the first object lens;
 determining the first layer of the cytology specimen that includes the target cells based on the images associated with the other regions; and
 obtaining images of the first layer through the first object lens.

12. The method of claim 1, wherein the obtaining the second set of one or more images further comprises:
 driving the second object lens to focus on a second space of the cytology specimen defined by the first subregion and the second depth of field; and
 obtaining an image of the second space to be one of the second set of one or more images, wherein the second space is associated with the sublayer.

13. The method of claim 1, further comprising, in response to the obtaining images associated with the target cells in an image associated with the first space, driving the second object lens to focus on a third space of the cytology specimen adjacent to the first space and obtaining an image of the third space to be one of the second set of one or more images.

14. A system to obtain images associated with target cells distributed in a three-dimensional manner in a cytology specimen, comprising:

a processor; and
a non-transitory computer-readable medium having stored thereon instructions that, in response to execution by the processor, cause the processor to:
 obtain a first image associated with a first region of the cytology specimen through a first object lens having a first field of view and a first depth of field in the first field of view, wherein a first layer of the cytology specimen corresponds to the first depth of field;
 determine a first subregion of the first region based on image characteristics associated with the target cells, wherein a first number of the target cells are distributed in a first space defined by the first subregion and the first depth of field, wherein the first space is associated with the first layer;
 obtain a second set of one or more images associated with the first subregion through a second object lens having a second field of view and a second depth of field in the second field of view, wherein the second depth of field corresponds to a sublayer of the first layer;
 identify a third image from the first image based on image characteristics associated with the target cells, wherein the third image is associated with the first subregion and covers the first number of the target cells; and
 obtain images associated with the target cells based on the second set of one or more images in response to a comparison between the second set of one or more images and the third image.

15. The system of claim 14, wherein the non-transitory computer-readable medium having stored thereon additional instructions that, in response to execution by the processor, cause the processor to identify the target cells from the first image based on the image characteristics.

16. The system of claim 14, wherein the second set of one or more images correspond to images obtained from different sublayers in the second field of view.

17. The system of claim 14, wherein the third image is a subset of the first image.

18. The system of claim 14, wherein the comparison is associated with a ratio of a second number of the target cells in the second set of one or more images to the first number of the target cells in the third image being in a predetermined range.

19. The system of claim 14, wherein the non-transitory computer-readable medium having stored thereon additional instructions that, in response to execution by the processor, cause the processor to:
 drive the second object lens to focus on a second space of the cytology specimen defined by the first subregion and the second depth of field; and
 obtain an image of the second space to be one of the second set of one or more images, wherein the second space is associated with the sublayer.

20. The system of claim 14, wherein the non-transitory computer-readable medium having stored thereon additional instructions that, in response to execution by the processor, cause the processor to:
 in response to the obtaining images associated with the target cells in an image associated with the first space, drive the second object lens to focus on a third space of the cytology specimen adjacent to the first space and obtain an image of the third space to be one of the second set of one or more images.

* * * * *